Feb. 6, 1968 A. SKROBISCH 3,368,201

PLURAL FREQUENCY DATA TRANSMISSION SYSTEM WITH SEGMENTED EXHIBITOR READOUT

Filed Aug. 23, 1963 3 Sheets-Sheet 1

INVENTOR.
ALFRED SKROBISCH
BY James and Franklin
ATTORNEYS

Feb. 6, 1968 A. SKROBISCH 3,368,201

PLURAL FREQUENCY DATA TRANSMISSION SYSTEM
WITH SEGMENTED EXHIBITOR READOUT

Filed Aug. 23, 1963 3 Sheets-Sheet 2

INVENTOR.
ALFRED SKROBISCH

BY James and Franklin

ATTORNEYS

INVENTOR.
ALFRED SKROBISCH
BY James and Franklin
ATTORNEYS

United States Patent Office 3,368,201
Patented Feb. 6, 1968

3,368,201
PLURAL FREQUENCY DATA TRANSMISSION SYSTEM WITH SEGMENTED EXHIBITOR READOUT

Alfred Skrobisch, 69 Wyoming Drive, Huntington Station, N.Y. 11746

Filed Aug. 23, 1963, Ser. No. 304,097
13 Claims. (Cl. 340—154)

ABSTRACT OF THE DISCLOSURE

The system has widely spaced signs controlled from a remote transmitting station. Each sign has a plurality of segmented exhibitors controlled by a local receiver having filters for different audio frequencies for the different segments of the exhibitors. By the addition of only one more frequency, the same segment frequencies and filters may be used also as identification frequencies to select any one or more or all of the receivers and signs on which a desired array of characters is to be exhibited.

This invention relates to a data transmission and exhibiting or readout system, and more particularly to such a system for remotely controlling a changeable readout or display sign.

A primary object of the invention is to generally improve such systems. A more particular object is to provide a system which displays changeable exhibitor or readout units, each being changeable to present any of a number of characters, usually alpha-numeric characters. The exhibitors are segmented for this purpose, and the segments are controlled by remote control.

Still another object is to provide such exhibitors at a series of stations, combined with a data transmission system which permits selection of any desired station at which the display of characters is to be changed, without affecting the display of characters at other stations. In one specific form, an object of the invention is to equip a highway or turnpike with a series of road signs any one of which may be changed from time to time from a central or headquarters station, in accordance with prevailing conditions, e.g. calling for slow speed because of fog or the like, or calling for stopping because of an accident, and so on.

In accordance with a further feature and object of the invention, all receiving stations or any desired group of receiving stations may be made simultaneously receptive to the transmitter, so that all may be changed simultaneously and alike.

To accomplish the foregoing objects, and other more specific objects which will hereinafter appear, my invention resides in the data transmission and readout elements, and their relation one to another, as are hereinafter more particularly described in the following specification. The specification is accompanied by drawings, in which.

Figure 3:
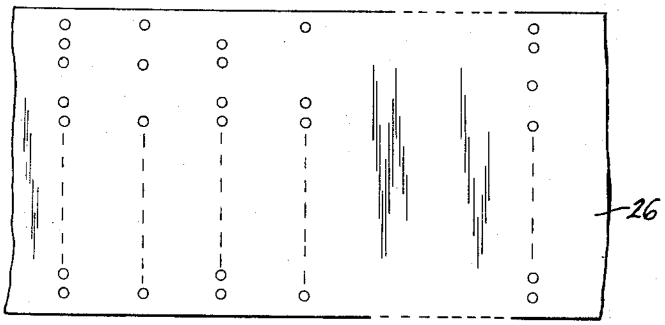
FIG. 3 shows a perforated card, representative of a series of such cards, which may be used to define and to transmit a text which is to be exhibited.
Figure 4:
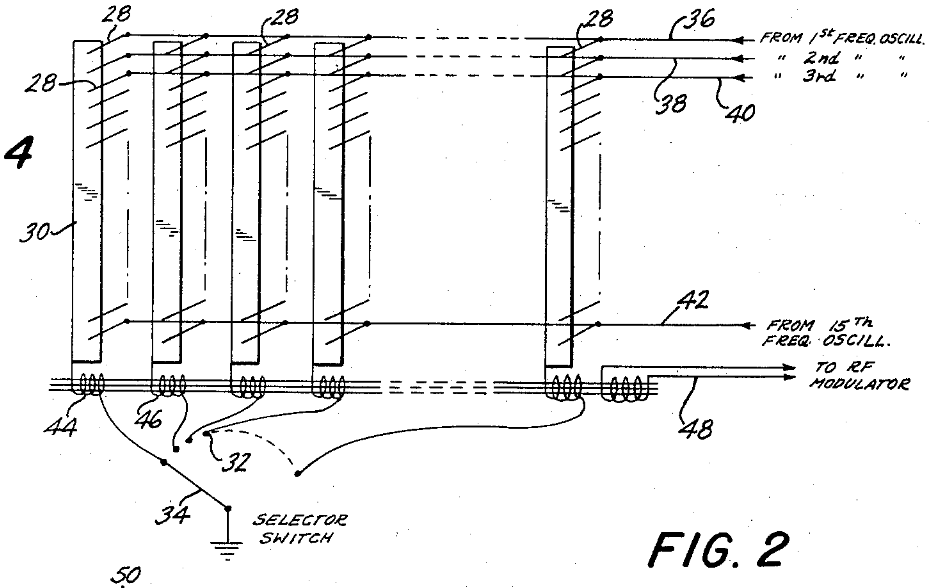
Figure 5:
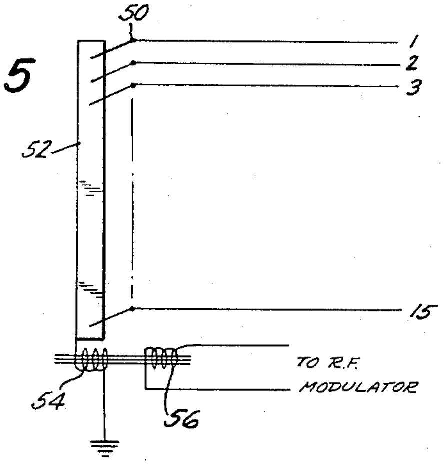
Figure 6:
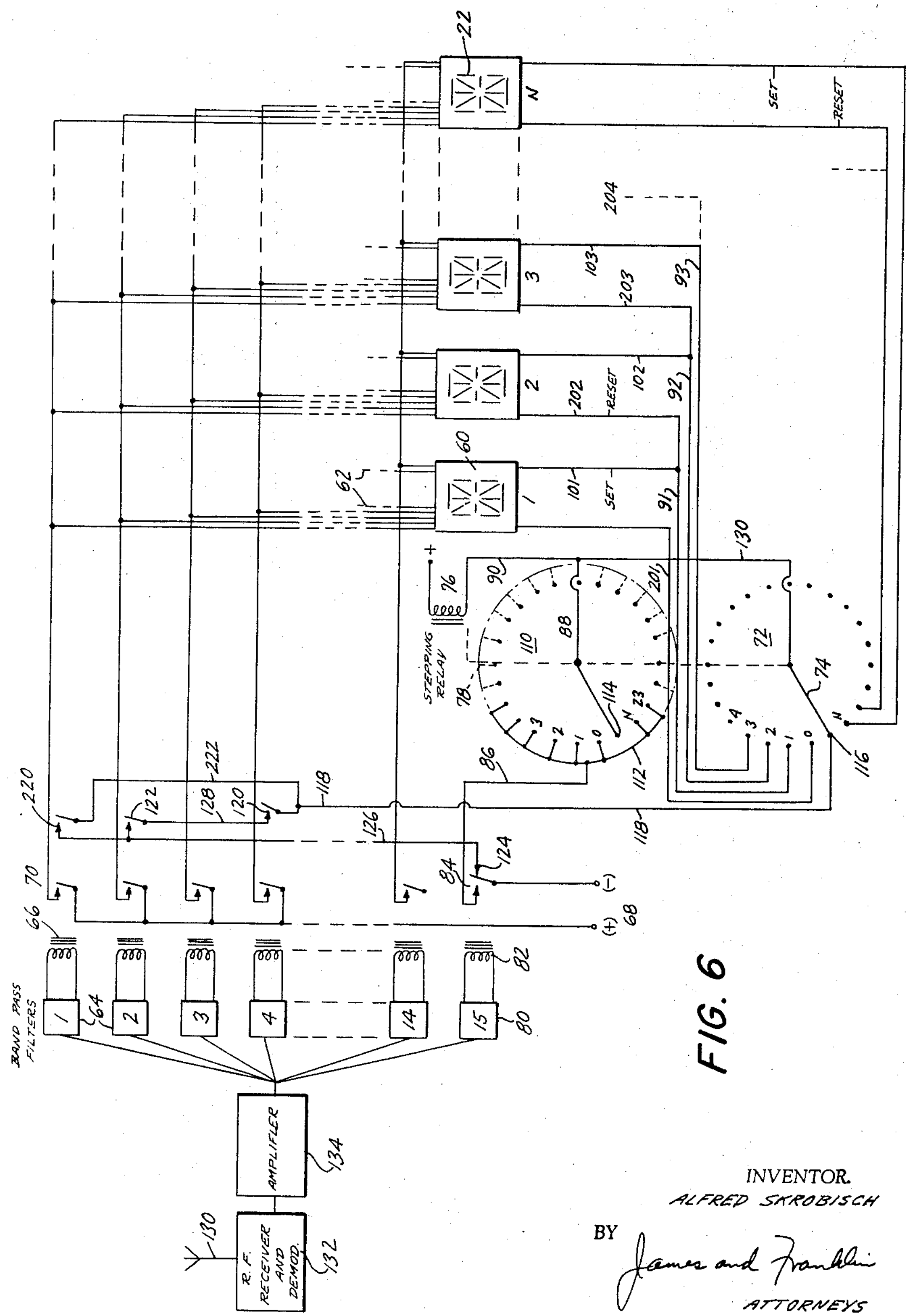
Figures 7, 8, 9, 10, 11:
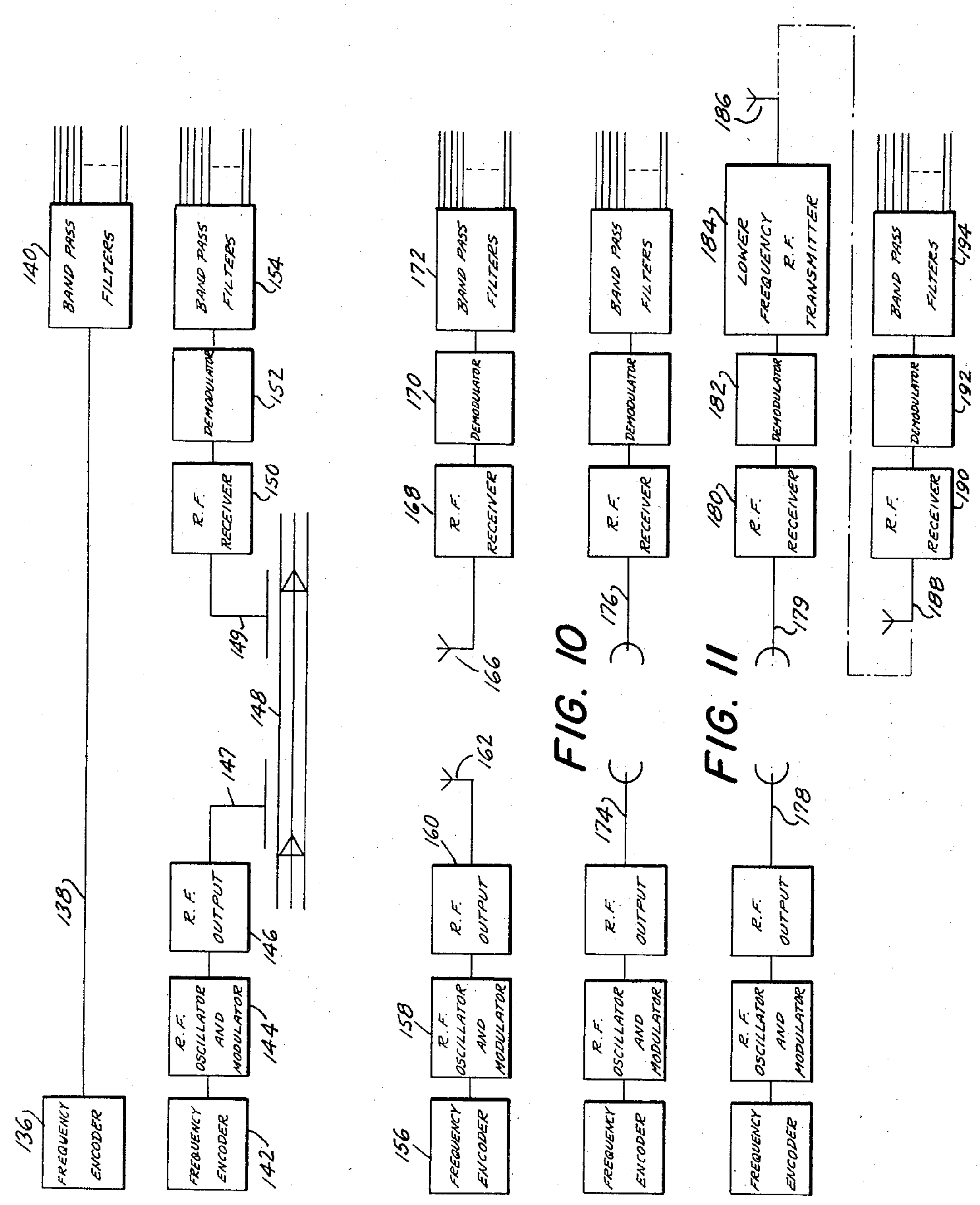

FIG. 4 schematically shows a contact unit adapted to receive a card such as that shown in FIG. 3;

FIG. 5 represents another form of contact device which may be used with the card of FIG. 3, when combined with means to relatively move the card and the contacts;

FIG. 6 is a wiring diagram for a receiving system to be used at one of the display boards;

FIG. 7 is a schematic diagram for a system in which the central station is connected to the receiving stations by means of a telephone line;

FIG. 8 is a block diagram for a system in which the data is applied to a carrier frequency which is transmitted over existing power lines;

FIG. 9 is a block diagram for a system in which the data is broadcast by omnidirectional radio transmission;

FIG. 10 represents a system in which the transmission is line-of-sight directional transmission by a microwave energy; and FIG. 11 shows a directional microwave system in which, at one or more receiving points, the information is rebroadcast omnidirectionally at a lower frequency.

Figure 1:
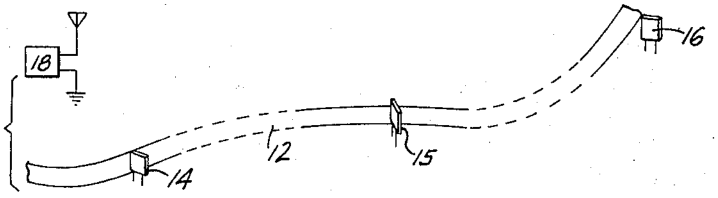
FIG. 1 is a symbolic view showing the invention applied to highway road signs.

Referring to the drawing, and, more particularly to FIG. 1, a turnpike or express highway 12 has a series of widely spaced road signs 14, 15 and 16 therealong. At a suitable headquarters, there is a transmitter 18, which in the present case broadcasts data to be displayed on one or another of the signs. The number of characters available on each sign is highly variable. In a typical case, there may be twenty-four characters, which could be displayed on a single line, or on two lines of twelve each, or more likely on three lines of eight characters each.

The characters are segmented or universal, and this is suggested in FIG. 6 in which characters at 1, 2, 3 . . . N are displayed by exhibitor units or readouts each having fourteen segments, as shown at 22. Each segment may be made effective or ineffective, and by using the appropriate segments a desired alpha-numeric character may be displayed. The individual readout may vary greatly in structure, and is not described here in detail, but a preferred form of readout for a large sign is described and claimed in my copending application Ser. No. 312,685, filed Sept. 30, 1963, and entitled Segmented Exhibitor, now abandoned. For smaller characters the readout may be like that disclosed in my Patent 3,096,594, issued July 9, 1963, and entitled "Variable Exhibitor."

Figure 2:
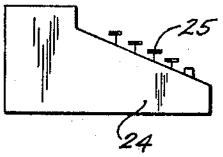
FIG. 2 represents the side view of a keyboard which may be used for transmission of desired characters to be exhibited on one or another of the road signs or other display boards.

Referring now to FIG. 2, the unit 24 represents a multiple switching device, preferably having keys 25 like a typewriter keyboard, in which each key closes the circuits of selected oscillators, thereby giving a chord of frequencies corresponding to a desired character. The term "chord" is not used in a musical sense. It does not mean harmonics. It means merely the simultaneous use of a plurality of frequencies. For the present purpose, with fourteen segments as shown in FIG. 6, fifteen frequencies are provided, and the keyboard constitutes a switching device which closes switches for the desired frequencies. The frequencies correspond to the segments, and a group of segments combine to display the desired character.

Because the text to be displayed by the signs may be limited to one or another of a limited group of possible texts, it may be considered more convenient to employ perforated cards instead of a keyboard. Such a card is shown in FIG. 3 of the drawing, the card 26 having vertical columns of holes. Each column has a maximum of fifteen holes, corresponding to the fifteen available frequencies. The number of columns depends on the number of characters on the display boards or signs, and in the present case it is assumed, by way of example, that there are twenty-four columns corresponding to twenty-four possible characters in each road sign.

The perforations in the card permit the closing of a switching contact to a contact plate or grounded base beneath the card. There are known arrangements for this, one of which is schematically illustrated in FIG. 4, in which the card remains stationary. There are as many columns of contacts 28 as there are columns of holes in the card, in this case twenty-four such columns. Each column of contacts has fifteen contacts corresponding to fifteen frequencies. The contacts or spring feelers in each column seek to make contact with a grounding bar 30 therebeneath, and in the present case there are twenty-four such bars. These are connected to the contacts 32 of a selector switch having a movable arm 34.

All of the top contacts are connected by a conductor 36 to an oscillator providing the first frequency. All of the second contacts are connected by a conductor 38 to an oscillator providing the second frequency. All of the third contacts are connected by a conductor 40 to an oscillator providing the third frequency, and so on down to conductor 42 which supplies energy having the fifteenth frequency.

The selector switch 34 may be used to make one column after another effective, thereby transmitting one chord of frequencies after another for transmission to the display board or road sign. One possible coupling is here indicated in simple fashion by a series of primary coils 44, 46, etc. for an audio frequency transformer, the secondary 48 of which leads to a modulator where the audio wave may be used to modulate a high-frequency carrier wave. With a telephone line the audio wave may be used directly.

The contact arrangement shown in FIG. 4 may be simplified by mounting the card (or the brushes) for movement, and such an arrangement is shown in FIG. 5, in which there is only a single column of contacts which may be in the form of brushes 50. These are connected to oscillators providing the first to the fifteenth frequency, as shown by conductors 1, 2, 3, . . . 15. The brushes 50 cooperate with a grounding bar or base plate 52, and control a circuit through the primary 54 of an audio frequency transformer, the secondary 56 of which leads to a modulator for modulating a carrier frequency (or to a telephone line), as previously described. The essential difference in this case is that the card is moved from left to right, either step-by-step, or continuously at an appropriately moderate speed, to change the readouts sequentially, until the desired new text is displayed on the board or road sign.

The receiver may be described in greater detail with reference to FIG. 6 of the drawing. A typical readout unit for one character is shown at 60. This readout has fourteen segments, any of which may be exposed or made visible by energization of a corresponding wire in a bundle of fourteen wires 62 leading to the readout. The receiver includes a like plurality of filters, indicated at 64, these being tuned to select and pass electrical waves of different frequency, there being one frequency for each segment of the exhibitor. The frequencies are preferably audio frequencies. There is also a means responsive to the output of each filter for energizing a corresponding segment, so that reception of different combinations of frequencies provides one or another of different characters on the exhibitor.

In the particular case here shown, there is a relay coil 66 responsive to the output of each filter, and a local source of electrical energy is connected at terminals 68. This is preferably a D.C. source, but it could be a source of A.C. If desired the filter blocks 64 may include output detectors or rectifiers, so that the relays 66 are supplied with D.C. instead of A.C. The source 68 is connected through the relay contacts 70 to energize and make effective the segments of the exhibitor.

As so far described, for a single readout there would be fourteen filters and relays for the fourteen segments, the circuit being completed by a common return. In practice the sign or display board has a series of such readout units to display a series of characters. This is indicated in FIG. 6 by the line of readouts marked 1, 2, 3, . . . N. In a typical case, there may be twenty-four readouts, but the number is not at all critical. They may be made effective sequentially by appropriate means.

In the present case the apparatus further includes a stepping relay or equivalent switching means having at least as many steps as there are characters in the display. In the present case, the stepping relay comprises a ring or deck of contacts 72, and a contact arm 74 movable thereover. There are N plus two contacts, or in this case twenty-six contacts for twenty-four characters. In a typical case there would be a ratchet wheel to turn arm 74, and a pawl reciprocated by a solenoid 76, such known mechanism being symbolized here by a dotted-line connection 78. Fifteen instead of fourteen frequencies are employed, the fifteenth filter being shown at 80, its relay coil at 82, its normally open relay contact at 84. This usually leads through conductors 86, 88 and 90 to the solenoid 76 of the stepping relay. Contact 84 is on the back or negative side of the supply source 68, and the other or upper terminal of solenoid 76 is connected to the positive side of the supply circuit.

Referring to the deck or ring of contacts 72, it will be seen that contact 1 is connected by conductor 91 to the "set" wire 101 of readout #1. It is also connected to the "reset" wire 202 of readout #2, thus clearing the second character while setting up the first character. Similarly, the contact 2 of deck 72 is connected by conductor 92 to the set wire 102 of readout #2, and at the same time to the reset wire 203 of readout #3. Again, contact 3 of deck 72 is connected by conductor 93 to the set wire 103 of readout #3 and to the reset wire 204 of readout #4. This continues to the last readout #N, the "set" wire of which is connected to contact N of the stepping relay.

The frequency of filter 80 (the stepping frequency) may be called a "control" frequency, and at the transmitting station the control frequency is transmitted as each chord or combination of frequencies is transmitted, and thus the characters are set up one after another until the desired display is completed. The stepping relay has at least one more contact than the number of characters, so that setting up of character #N does not wipe out character #1. Such an extra contact is that marked "0" in ring 72. Contact "0" clears readout #1, it being connected by wire 201 for that purpose.

As so far described, there would be only a single receiving station, or multiple stations all of which are changed alike. However, in preferred form, the transmitter may select one of a series of stations to be changed, and this is done without requiring additional transmission frequencies. For this purpose the stepping relay 72 preferably has two more steps or contacts than the number of characters in the display, and the stepping relay also has an additional deck of contacts indicated at 110. The movable contact arms rotate together. The contacts of deck 110 are all connected together, as indicated by the annular conductor 112, except for one contact 114, which is left open-circuited.

The contact in deck 72 which corresponds to contact 114 is marked 116, and is connected by a conductor 118 to a plurality of extra relay contacts which are arranged in series. In this case there are contacts 120 and 122 which may be considered to be "identification" contacts. The particular station here shown is identified by frequencies 2 and 4, which when used in combination, act as a signature to identify the particular station. The contacts 120 and 122 are on relays for frequencies 2 and 4. In practice, all relays have extra contacts, but only those on the identification relays are used. Another station would have a different combination of any two of the available frequencies.

Relay 82 has a back contact 124 which is connected by a conductor 126 to contact 122, and thence through series conductor 128 to contact 120, and thence through conductor 118 to the contact 116 of deck 72. This in turn leads through contact arm 74 and conductor 130 to the stepping relay coil 76.

On reflection, it will be seen that the normal stepping of the stepping relay, when setting up the display, requires that the fifteenth or stepping frequency flow through deck 110. The last operation of step moves the upper relay arm from contact N to contact 114, where no further stepping can take place. The station then is inoperative, and does not respond to transmissions being sent to other receiving stations. The display or sign remains as last set up, unless and until the transmitter selects and identifies the particular receiving station, which is done by manually transmitting the proper identification combination of frequencies (in this case the second and fourth frequencies), thereby closing contacts 120 and 122, and so energizing the stepping relay solenoid 76 through the contact 116 of lower deck 72 (instead of the upper deck 110). This moves the stepping relay to the contacts marked "zero."

The zero contact of deck 72 serves through conductor 201 to reset or clear character 1, and the transmission continues as previously described, the control frequency (the fifteenth frequency) serving to step the stepping relay, and a chord of frequencies serving to set up the first character and to clear or reset the second, as previously described.

Because the fifteenth frequency is transmitted along with the chord of frequencies for the desired character, the resulting operation of relay 82 shifts its movable contact from right contact 124 to left contact 84, thereby opening the series circuit through the identification contacts 122 and 120. Because of this, no station will respond accidentally to a chord which happens to include its identification frequencies, but which is being transmitted for character setup in some other station. Differently expressed, the identification chord must be transmitted without the fifteenth or stepping frequency, in order to serve for selection of a desired receiver.

If it be desired to transmit the same display of characters to all stations simultaneously, an extra relay contact 220 may be employed, this being on the relay for the first frequency in all stations, and being connected by a conductor 222 in shunt around the series-connected identification contacts 120 and 122. The first frequency is not employed for identification purposes, it being left clear for the present "all station" purpose. The conductor 222 is connected around the two identification contacts, regardless of which frequencies are used for identification at any particular station. In consequence, by transmitting the first frequency alone, instead of an identification chord, all stations respond alike and all are made receptive to the ensuing transmission.

Of course, the "all station" frequency need not necessarily be the first. It may be any of the fourteen frequencies, when excluded from those used for station identification, and instead reserved for the "all station" call.

With a limited number of receivers, a single identification frequency may be employed instead of a chord of two identification frequencies. In such case, the extra contact of the "all station" relay would shunt the extra contact of the single identification relay, instead of shunting two series-connected contacts as here shown. On the other hand, if there were a large number of receivers, chords of three instead of two frequencies might be employed, thereby greatly increasing the number of combinations available for identification. In such case, the "all station" contact would shunt the series of three identification contacts.

In respect to the reset connections 201, 202, 203 etc. shown in FIG. 6, it will be understood that in each readout module or character there is an electrically isolated reset coil wound with each "set" coil for each segment. The reset coils for each module are all connected in parallel and, in this illustrative case, all the plus ends of all the reset coils of all the modules are connected permanently together and to the plus terminal of the power supply. Connected of the minus reset lead of any module to the minus terminal of the power supply causes resetting of that module. Hence, if the negative lead is connected to the "set" lead of module ($N-1$) and at the same time to the reset lead of module N, the latter will be reset and will be available for new "set" pulses. This is not the only way to accomplish resetting, but is it at present a preferred way, and is given as an illustration.

Reverting to FIG. 6, if the transmission is by radio, it is received on an antenna 130 and fed to a receiver 132, the demodulation output of which is in the audio frequency range. This may be amplified in an audio amplifier 134, and then is supplied to the fifteen filters previously referred to.

The transmission may be in different ways. Thus, referring to FIG. 7, the transmitter 136 may be connected by a telephone line circuit 138 to a receiver 140 comprising the band pass filters, there being multiple output lines from the filters leading to the segments, or leading to relays which in turn lead to the segments, all as previously described in connection with FIG. 6. It is understood that many such receivers 140 may be connected to telephone line 138.

In FIG. 8, the audio frequency output from encoder 142 is used to modulate a radio frequency carrier supplied at 144. This is amplified at 146 and sent or guided over power lines 148 which happen to parallel the highway being serviced. The coupling at 147 may be of known type. At a receiving station, the carrier is coupled at 149 to a radio frequency receiver 150 including a demodulator 152, the audio frequency output of which is supplied to band pass filters at 154 having a multiple wire output, as previously described.

In FIG. 9, the audio frequency supplied by frequency encoder 156 is used to modulate radio frequency supplied by a suitable oscillator at 158, and the output is amplified at 160 and broadcast through an antenna 162. At the receiver, the broadcast energy is picked up by antenna 166 and supplied to a radio frequency receiver 168 including a demodulator 170, the audio frequency output of which is supplied to band pass filters at 172, with a multiple wire output, as previously described.

In FIG. 10, the system is the same as in FIG. 9, except that there is a highly directional transmitting antenna 174 which is aimed or pointed at a highly directional receiving antenna 176. In other words, in this case the transmission is point-to-point at microwave frequency, instead of broadcast at lower radio frequency.

In FIG. 11, the system used is a combination of what is shown in FIGS. 9 and 10. The transmitter has a highly directional antenna 178 which is pointed at a highly directional receiving antenna 179 at a re-transmitting station. The latter has a receiver 180 and a demodulator 182 to reduce the carrier frequency to a lower frequency which is still a radio frequency and which is suitable for broadcasting. The transmitter is indicated at 184 and its broadcast antenna at 186. This may service a number of display signs in its area, each having its own receiver. The local receiver at the sign has an antenna 188 leading to a receiver 190 which includes a demodulator 192, the audio frequency output of which is fed to band pass filters at 194 having a multiple wire output, as previously described. There may be a number of rebroadcast stations, each serving a number of signs in its area.

The broadcasting or omnidirectional transmission may be either A.M. or F.M. The directive line-of-sight transmission preferably employs microwave energy. The system of FIG. 11, in which there is microwave directional transmission to a receiving point, at which there is lower frequency A.M. or F.M. transmission, is a method commonly employed for sending messages to patrol cars on a turnpike or thruway.

The audio frequency range employed is not critical. In a specific case, frequencies from 5,000 to 10,000 cycles were employed, and the individual frequencies were selected in the ratio of the fifteenth root of two, which comes out 1.047. Accordingly, the first frequency was 5,000 cycles; the second was 5,000 times 1.0473 or 5236.5; the third frequency was the second frequency times 1.0473 or 5484.2; and so on. The fifteenth frequency was 9549.2 c.p.s. The sixteenth would be 10,000 which is not used because it is a harmonic of 5,000. The fifteen frequencies are not and should not be harmonically related.

The selected frequencies may be established or controlled in known ways, as by the use of tuning forks, tone wheels, or electronic oscillating circuits.

To select the station at which the display is to be changed, the identification frequencies may be transmitted manually, following which an appropriately selected punched card may be used to automatically transmit the characters which are to be displayed. If the same change is to be made at a number of stations, the identification chords of all of these stations may be sent before using the punched card, and the latter will then serve for simultaneous response at all of the called stations. In an emergency such that all stations are to be called, the reserved "all station" frequency is first used.

It should be mentioned that the characters need not be limited to alphabetic and numeric characters. In some cases, a special character may be wanted, for example, a directional arrow, and an appropriate segment or segments may be displayed for that purpose.

It is believed that the improved data transmission and display system of my invention, and the method of operation of the same, as well as the advantages thereof, will be apparent from the foregoing detailed description.

It will be understood that the number of segments in each readout may be varied. Thus, for numeric indications alone, seven segments are sufficient, and only eight frequencies would be needed. Different layouts of segments have been devised and may be used. If more segments were wanted the only change would be in the number of frequencies employed. The number of characters which may be displayed is highly variable. Stepping relays are available with a large number of contacts in each deck, and thus the display or sign could easily have fifty or even one hundred characters. The number of stations and the spacing of the stations are also variable and may be adapted to the conditions encountered. The data transmission is not necessarily used for highway purposes, and instead messages, stock quotations, or other data may be transmitted over long distances for instantaneous display at the receiving end. The circuitry is relatively simple and will operate at moderately high speeds, depending on the speed of response of the readout. Operation at twenty characters per second is feasible, but for very large readouts, the operation may be slower.

It will therefore be apparent that while I have shown and described the invention in a preferred form, changes may be made without departing from the scope of the invention, as sought to be defined in the following claims. In the claims, reference to a "plurality" of identification filters or frequencies or to an identification "chord" is not intended to exclude the more elementary use of a single identification frequency, as explained above.

The statement that transmission of identification frequencies alerts a corresponding receiver is not intended to exclude the alerting of a number of receivers if they are to receive the same exhibitor signals, as was explained above.

I claim:

1. A display system comprising a transmitting station and a plurality of receiving stations capable of response to the transmitting station, each of said receiving stations comprising a sign having an array of segmented exhibitors, and a receiver for controlling the segmented exhibitors, said receiver including a plurality of filters for electrical energy of different frequencies, there being one frequency for each segment and an additional filter for a control frequency, means responsive to the output of each segment filter for energizing a corresponding one of the segments of an exhibitor, whereby reception of different combinations of segment frequencies provides different characters on the exhibitor, a stepping relay having at least a dwell contact step and as many additional steps as there are exhibitors in the sign, the filter ouput of the control frequency being operatively connected to the stepping relay to cause normal stepping of the stepping relay, individual circuit means connected to each exhibitor to make said exhibitors responsive to the segment filter outputs at the corresponding steps of said stepping relay until the sign is provided with a desired array of characters, said transmitting station having means to generate a plurality of different frequency waves, one for each segment of the exhibitors at the receiving stations and one of the additional control frequency, and further including switching means to combine selected frequencies in chords which correspond to the segments producing a desired character on an exhibitor together with the control frequency, said transmitting station having means to transmit the same segment frequencies without the control frequency, and said receivers also having additional cooperating means utilizing and responsive to the same segment frequencies but operable only in the absence of the control frequency to step the stepping relay away from the dwell contact at and for the selection of one or more desired receiving stations for response to the transmitting station for a change of the display at said selected receiving stations.

2. A system as defined in claim 1, in which the circuitry which makes the first exhibitor responsive to the filters also resets the second exhibitor, and in which the circuitry which makes the second exhibitor responsive to the filters also resets the third exhibitor, and in which the third resets the fourth, and the fourth resets the fifth, until the sign is provided with a desired array of characters.

3. A system of widely spaced signs controlled from a remote transmitting station, each sign including a plurality of segmented exhibitors and an associated receiver, each receiver including a plurality of filters for electrical energy of different frequencies, there being a frequency for each segment of an exhibitor and an additional filter for a control frequency, means responsive to the output of each segment filter for energizing a corresponding one of the segments of an exhibitor, whereby reception of different combinations of frequencies provides different characters on an exhibitor, a stepping relay having more steps than the number of exhibitors in the sign, one extra step acting as a dwell contact, the filter output of the control frequency being used to cause normal stepping of the stepping relay, said stepping relay having two decks of contacts, the contacts of one deck being connected to respective exhibitors to provide a common return which completes the circuit which energizes the segments of that exhibitor which is connected to a particular contact, the corresponding contacts of the other deck being connected together except for the extra dwell contact of the latter deck which is open circuited, the corresponding dwell contact of the first deck being connected for response directly to one or more of the same aforesaid segment filters acting then as identification filters, the said one or more segment filters which act as identification filters for the said dwell contact using different frequencies at each receiver, the arrangement being such that transmission of the appropriate segment frequencies acting as identification frequencies and without the control frequency alerts a corresponding receiver by moving its stepping relay from the dwell contact around to the first working contact, following which the transmission of a chord of frequencies along the control frequency sets the first exhibitor, the subsequent transmission of a second chord of frequencies with the control frequency sets the second exhibitor, and so on until a desired array of characters is exhibited at the alerted receiver, whereupon the stepping relay moves to the dwell contact, thereby making it possible to alert a different sign and receiver by transmitting its identification chord without the control frequency as described above, following which the latter sign may be set to exhibit desired characters, and so on for any one or more signs in the system.

4. A system as defined in claim 3, having circuitry at the receiver whereby the chord of frequencies combined with the control frequency which sets the first exhibitor also resets the second exhibitor, and in which the chord of frequencies combined with the control frequency which sets the second exhibitor also resets the third exhibitor, and in which the third resets the fourth, and the fourth resets the fifth, until the sign is provided with a desired array of characters.

5. A system as defined in claim 3, in which one of the segment frequencies is reserved for the additional purpose of calling all receivers simultaneously, and in which the receiver has a shunt circuit for said all-station frequency which circuit is connected in shunt around the circuit of the identification frequencies, and which circuit has normally open contacts and means responsive to said all-station frequency to close the same.

6. A display system comprising a transmitting station and a plurality of receiving stations capable of response to the transmitting station, each of said receiving stations comprising a receiver as defined in claim 3, said transmitting station having means to generate a plurality of different frequency waves, one for each segment of the exhibitors at the receiving stations and an additional control frequency, and further including switching means to transmit selected frequencies in chords which correspond to the segments producing a desired character on an exhibitor together with the control frequency, said switching means also having means to transmit selected frequencies without the control frequency for selection of a desired receiving station for response to the transmitting station.

7. A display system comprising a transmitting station and a plurality of receiving stations capable of response to the transmitting station, each of said receiving stations comprising a receiver as defined in claim 3, said transmitting station having means to generate a plurality of different frequency waves, one for each segment of the exhibitors at the receiving stations and an additional control frequency, and further including switching means to transmit selecter frequencies in chords which correspond to the segments producing a desired character on an exhibitor together with the control frequency, said switching means also having means to transmit selected frequencies without the control frequency for selection of a desired receiving station for response to the transmitting station, said switching means including a perforated card to automatically transmit the text of a desired message to be displayed at the receiving station, the aforesaid switching means being controlled by the perforations in the card.

8. A system of widely spaced signs controlled from a remote transmitting station, each sign including a plurality of segmented exhibitors and an associated receiver, each receiver including a plurality of filters for electrical energy of different frequencies, there being a frequency and filter for each segment of an exhibitor and an additional filter for a control frequency, a relay responsive to the output of each filter, a local source of electrical energy connected to the contacts of the relays and through them to the segments of an exhibitor, whereby reception of different combinations of frequencies provides different characters on an exhibitor, a stepping relay having two more steps than the number of exhibitors in the sign, one of said extra steps acting as a dwell contact, the filter output of the control frequency being used to cause normal stepping of the stetpping relay, said stepping relay having two decks of contacts, the contacts of one deck being connected to respective exhibitors to provide a common return which completes the circuit which energizes the segments of that exhibitor which is connected to a particular contact, the corresponding contacts of the other deck being connected together except for the extra dwell contact of the latter deck which is open circuited, the corresponding dwell contact of the first deck being connected to the contacts of a plurality of identification relays in series, the frequencies for operating said identification relays being the same frequencies as the segment frequencies and being used in different combinations at the receivers, the arrangement being such that transmission of the appropriate segment frequencies acting as identification frequencies without the control frequency alerts a corresponding receiver by moving its stepping relay from the dwell contact to the first working contact, whereas the transmission of a chord of frequencies along with the control frequency sets the first exhibitor and resets the second, the subsequent transmission of a second chord of frequencies with the control frequency sets the second exhibitor and resets the third, and so on, until a desired array of characters is exhibited at the alerted receiver, whereupon the stepping relay moves to the dwell contact, thereby making it possible to alert a different sign and receiver by transmitting its identification chord without the control frequency as described above, following which the latter sign may be set to exhibit desired characters, and so on, for any one or more signs in the system.

9. A system as defined in claim 8, in which the segmented exhibitors are alpha-numeric exhibitors, and in which the segment frequencies which act also as identification frequencies are in the audio frequency range.

10. A system as defined in claim 8, in which one of the segment frequencies is reserved for the additional purpose of calling all receivers simultaneously, and in which the relay of said all-station frequency has an extra normally open contact connected in a circuit which is in shunt around the identification contacts of the identification relays, said contact being closed in response to the all-station frequency.

11. A system as defined in claim 8, in which one of the segment frequencies is reserved for the additional purpose of calling all receivers simultaneously, and in which the relay of said all-station frequency has an extra normally open contact connected in a circuit which is in shunt around the identification contacts of the identification relays, said contact being closed in response to the all-station frequency, and in which the identification and all-station contacts are connected in series with the normally closed contact of the control frequency relay, whereby the transmission of the control frequency during normal transmission disconnects the identification and all-station contacts so that transmission of the same frequencies for setting up a character will not affect the identification and all-station circuitry.

12. A display system comprising a transmitting station and a plurality of receiving stations capable of response to the transmitting station, each of said receiving stations comprising a receiver as defined in claim 8, said transmitting station having means to generate a plurality of different frequency waves, one for each segment of the exhibitors at the receiving stations and an additional control frequency, and further including switching means to transmit selected frequencies in chords which correspond to the segments producing a desired character on an exhibitor together with the control frequency, said switching means also having means to transmit selected frequencies without the control frequency for selection of a desired receiving station for response to the transmitting station.

13. A display system comprising a transmitting station and a plurality of receiving stations capable of response to the transmitting station, each of said receiving stations comprising a receiver as defined in claim 8, said transmitting station having means to generate a plurality of different frequency waves, one for each segment of the exhibitors at the receiving stations and an additional control frequency, and further including switching means to transmit selected frequencies in chords which correspond to the segments producing a desired character on an exhibitor together with the control frequency, said switching means also having means to transmit selected frequencies without the control frequency for selection of a desired receiving station for response to the transmitting station, said switching means including a perforated card to automatically transmit the text of a desired message to be displayed at the receiving station, the aforesaid switching means being controlled by the perforations in the card.

References Cited

UNITED STATES PATENTS

| | | | |
|---|---|---|---|
| 2,948,886 | 8/1960 | McIlwain | 340—152 |
| 2,978,676 | 4/1961 | Spencer | 340—154 |
| 3,094,862 | 6/1963 | Brosh et al. | 340—22 |
| 3,106,696 | 10/1963 | Foley | 340—154 |
| 3,281,789 | 10/1966 | Wilcox et al. | 340—154 |

THOMAS B. HABECKER, *Acting Primary Examiner.*

NEIL C. READ, *Examiner.*

A. J. KASPER, *Assistant Examiner.*